United States Patent [19]

Rosenplanter

[11] Patent Number: 5,050,776
[45] Date of Patent: Sep. 24, 1991

[54] CARTRIDGE HEATER FOR FOAM DISPENSING APPARATUS

[75] Inventor: William F. Rosenplanter, Wallingford, Conn.

[73] Assignee: Olin Corporation, Cheshire, Conn.

[21] Appl. No.: 459,925

[22] Filed: Jan. 2, 1990

[51] Int. Cl.⁵ .............................. B05B 1/24
[52] U.S. Cl. .................... 222/146.5; 239/13; 239/133; 239/134
[58] Field of Search .................. 222/146.2, 146.5; 239/13, 133, 134, 135

[56] References Cited

U.S. PATENT DOCUMENTS

| | | |
|---|---|---|
| 2,551,078 | 5/1951 | Wing ................................. 239/134 |
| 2,976,392 | 3/1961 | Wabnitz . |
| 3,018,968 | 1/1962 | Levey . |
| 3,146,950 | 9/1964 | Lancaster . |
| 3,458,948 | 8/1969 | Curtis et al. ...................... 239/133 |
| 3,976,230 | 8/1976 | Sperry . |
| 4,096,973 | 6/1978 | Checko ........................... 222/146.5 |
| 4,154,368 | 5/1979 | Gusmer et al. . |
| 4,161,386 | 7/1979 | Osuna-Diaz ...................... 239/133 |
| 4,170,440 | 10/1979 | Gusmer et al. . |
| 4,708,292 | 11/1987 | Gammons ......................... 239/414 |

Primary Examiner—Andres Kashnikow
Assistant Examiner—Karen B. Merritt
Attorney, Agent, or Firm—Ralph D'Alessandro

[57] ABSTRACT

In a polyurethane foam dispensing apparatus there is provided a foam gun block heater for the isocyanate and the polyol feed lines to prevent cold shots from occuring when the foam dispensing apparatus is initially used.

13 Claims, 2 Drawing Sheets

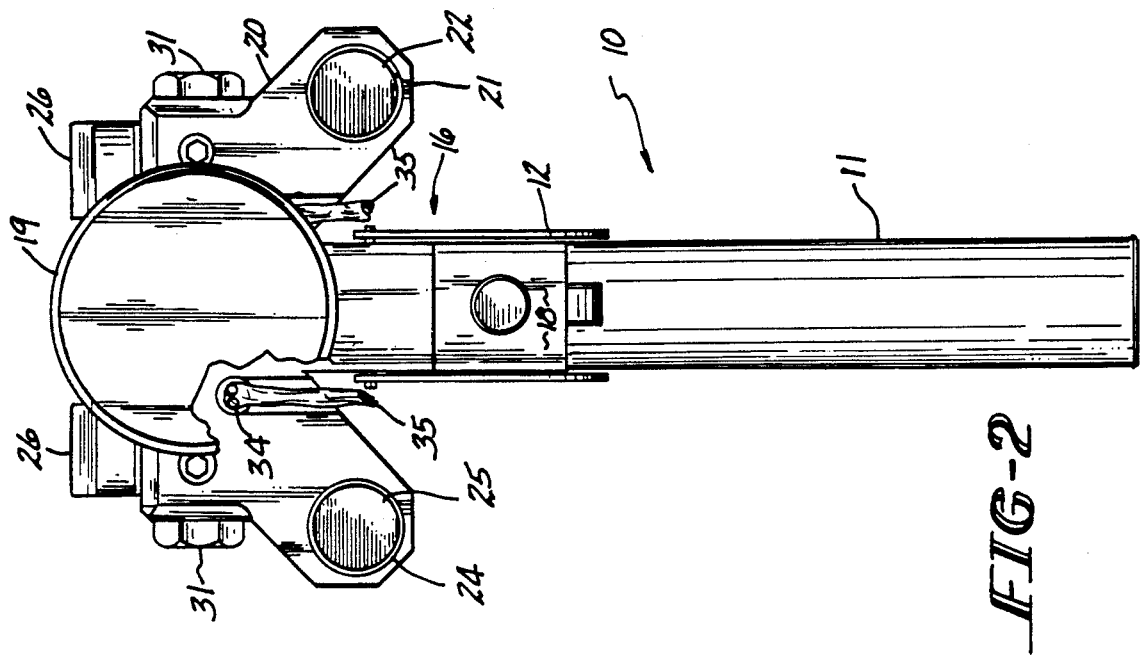
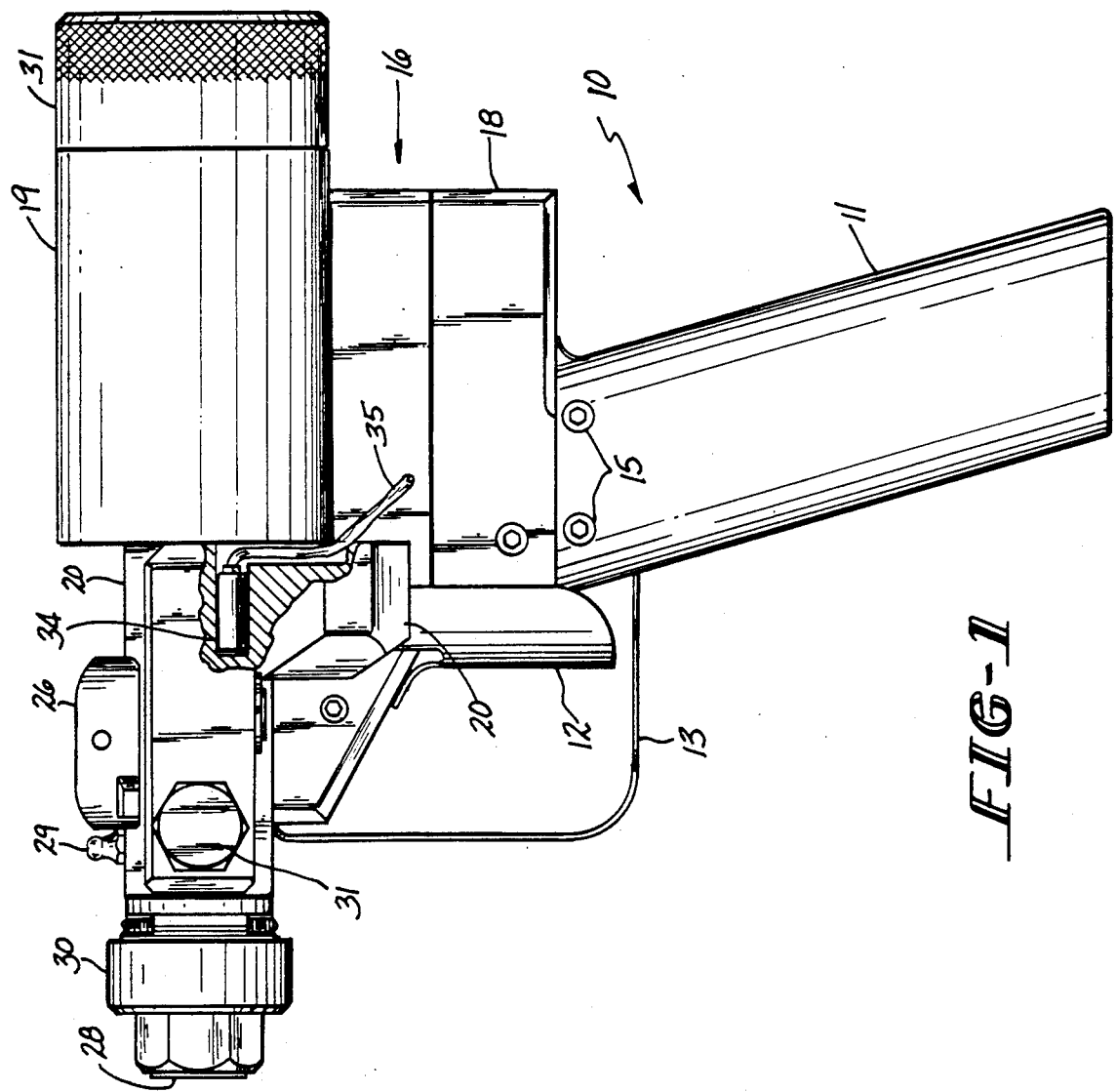

CARTRIDGE HEATER FOR FOAM DISPENSING APPARATUS

BACKGROUND OF THE INVENTION

The present invention relates generally to apparatus used to dispense a plurality of liquids through a single orifice, and more particularly, to the foam dispensing gun and heating apparatus used to heat the foam gun block through which the chemical reactants required to form polyurethane foams are dispensed.

Polyurethane foams are formed by the reaction of an isocyanate component and hydroxyl-bearing compounds. When mixed together in the presence of a catalyst, a surfactant, and a blowing agent, these chemicals react to form cellular cross-linked polymer chains, more commonly known as a polyurethane foam. Each of these components of the plural component material, by itself, is generally stable. Thus, each component will not cure or cross-link for extended periods of time, often as long as several months, if they are properly stored.

When the isocyanate component and the polyol component are mixed together in proper concentrations and at the proper temperature, an exothermic chemical reaction of the isocyanate and the polyol occurs. The polyol component is a preformulated compound that includes a surfactant, a catalyst and a blowing agent. The resulting exothermic reaction causes a continuing expansion of the mixed components that is evidence of the polymerization and manifests itself as a foam which cross-links and cures. The cross-linking and curing usually is substantially completed in a matter of seconds.

Polyurethane foam dispensers are well known and have achieved a high level of usage in factories where components must be adhesively lined with an insulating foam or where products must be packaged and protected from damage during shipment. In an effort to improve the efficiency of the operation of these foam dispensers and the quality of the product foam, attention has been focused on the factors which enhance the mixing of the plural components in a mixing chamber within the dispensing apparatus. One of the factors which can affect the quality of the mixed foam is the temperature of the components as they are fed into the mixing chamber. Keeping the plural component streams heated to between about 100° to about 125° Fahrenheit promotes thorough mixing and reaction of the plural components.

In an attempt to better control the temperature of each of the plural components delivered to the mixing chamber of a foam dispenser, various approaches have been taken to heat the chemicals prior to their entry into the mixing chamber. Storage tanks holding the separate isocyanate and polyol components have been heated. The feed lines from the storage tanks to the foam dispensing apparatus have also been heated by a variety of means. One method has employed a resistance heater positioned along the flow lines through which the fluids must pass at a specific point between the storage tanks and the foam dispenser. Another and more common approach, has been to use electric resistant heater coils inside each of the hoses which deliver the polyol and isocyanate components to continuously heat the plural components as they travel from the storage container to the dispensing apparatus.

However, none of these prior approaches deal with the problem of the initial few "cold" shots of foam that come from a foam dispensing apparatus that has been left overnight or left unused for a prolonged period of time so that the temperature of the foam dispenser is closer to the temperature of the ambient air than the heated temperature of the plural components being sent through from the feed hoses for mixing in the foam dispenser. The temperature of the foam dispensing apparatus, which is normally metallic, does not reach the same temperature of the heated plural components until several shots of mixed foam have been produced. Until this conductive heating of the gun or foam dispensing block has occurred by the passage of the heated components therethrough, inferior mixing of the isocyanate and polyol components occurs and an inferior quality foam is produced. Normally, these initial few shots of foam are discarded or wasted until the dispensing apparatus reaches proper operating temperature. This problem can be more acute where the dispensing apparatus is operated in a colder climate or in an unheated environment.

This problem is solved in the design of the present invention by providing in the foam dispensing apparatus that is used to dispense plural component polyurethane foam heating means within the foam dispensing gun block sufficient to heat the material of the foam dispensing gun block adjacent each component infeed.

SUMMARY OF THE INVENTION

It is an object of the present invention to provide means to heat the foam dispensing apparatus to the normally desired operating temperature of the plural components as they are fed thereinto for mixing.

It is another object of the present invention to provide a simple and low cost method for avoiding wasted isocyanate and polyol plural feed components due to inferior mixing in the mixing chamber of the foam dispensing apparatus when the apparatus is initially put into operation.

It is a feature of the present invention that a plural component dispensing apparatus has a high density cartridge heater inserted within a machined receptacle in the block of the foam dispensing apparatus to heat the apparatus to the operating temperature of the feed plural components prior to use.

It is another feature of the present invention that the electrical power lines for the high density cartridge heater are fed into the foam dispensing apparatus in the same manner as and along with the plural component feed lines.

It is yet another feature of the present invention that the high density cartridge heater is easily accessible and removable from the foam dispensing apparatus without requiring extensive disassembly of the foam dispensing apparatus.

It is an advantage of the present invention that cold shots of foam from the initial operation of the foam dispensing apparatus are avoided.

It is another advantage of the present invention that non-operation of the foam dispensing apparatus over an extended period of time in an unheated atmosphere will not impair the thorough mixing and reaction of the plural components upon initial operation of the dispensing apparatus.

It is yet another advantage of the present invention that more uniform and thorough mixing and reaction of the initial plural components fed to the foam dispensing apparatus is obtained.

These and other objects, features and advantages are obtained in the apparatus for heating the foam dispensing apparatus to a temperature approximately equivalent to the temperature of the individual polyol and isocyanate feed components so that the initial use of the foam dispensing apparatus after prolonged periods of non-operation produces thorough and complete mixing and reaction of the polyol and isocyanate components to produce high quality urethane foam.

BRIEF DESCRIPTION OF THE DRAWINGS

The advantages of this invention will become apparent upon consideration of the following detailed disclosure of the invention, especially when it is taken in conjunction with the accompanying drawings wherein:

FIG. 1 is a side elevational view of the foam dispensing apparatus with a portion broken away to show the cartridge heater in the gun block;

FIG. 2 is a rear elevational view of the foam dispensing apparatus showing a portion of the apparatus broken away to reveal the location of the cartridge heater on one side of the apparatus.

DETAILED DESCRIPTION OF THE PREFERRED EMBODIMENT

Figure 3:
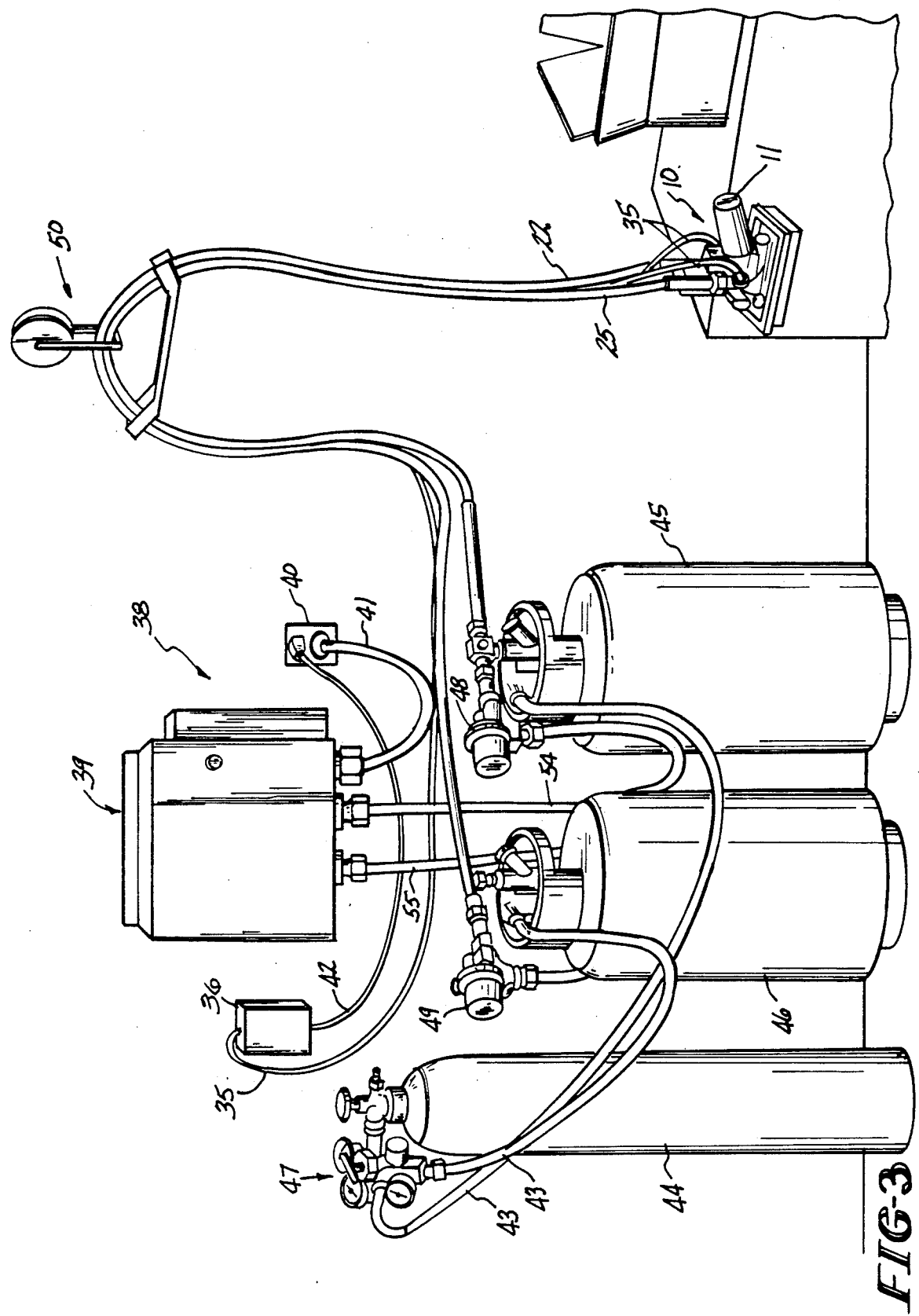
FIG. 3 is a diagramatic illustration of the foam dispensing system utilizing the foam dispensing apparatus of FIGS. 1 and 2 with the cartridge heater.

FIG. 1 shows the side elevational view of a plural component foam dispensing apparatus, indicated generally by the numeral 10. Apparatus 10 consists of a grip handle 11 and an upper gun portion, indicated generally by the numeral 16. Handle 11 has a trigger 12 and trigger guard 13 attached to it and the gun base 18. The trigger 12 may be an electric trigger switch or an air spool type of a trigger switch to activate the internal mechanisms within the apparatus 10 to permit the flow of plural components. The handle 11 is appropriately secured to the base 18 of the upper gun portion 16, such as with screws 15 or bolts or mechanically interlocking parts.

The upper gun portion 16 has a cylinder 19 threaded into a valve block 20. A polyol component fitting 21, with the polyol fluid hose 22 (partially shown), feeds into the valve block 20 to supply one of the plural components to the assembly 10. The polyol component passes from the fitting 24 through flow passages (not shown) in the valve block 20. A plug or shutoff valve 26 seen in FIGS. 1 and 2, as well as a filter plug cap 31, are used in the polyol component feed path to control the flow of infeed components to assembly 10. Comparable structures exist on the opposite side of the assembly 10 for the isocyanate fluid component, including isocyanate fluid hose 25 and isocyanate component fitting 24. The isocyanate plug cap 31 may be sized differently from the polyol component side plug cap to prevent inadvertent and undesirable interchange of parts, with the resultant cross-mixing and cross-linking of the plural components.

The nozzle is shown protruding through the end of a nozzle retaining cap 30, which is screwed into place to retain the nozzle 28 in position on valve block 20. A valving rod (not shown) extends through the nozzle and reciprocates within gun block 20. A grease fitting 29 can be used to supply lubricant to the valving rod and other moving components within the cylinder 19 and valve block 20. The cylinder 19 has an end closure cap 31.

Cylinder 19 has a main body that is generally cylindrical with a diameter size that can be selected according to the task to be performed and the foam output desired. Similarly the diameter of the valving rod (not shown) and the length of the nozzle 28 can also be varied. The cylinder 19 is fastened to the valve block 20.

Cylinder 19 has a pneumatically driven piston assembly (not shown) that fits therewithin and drives the valving rod (also not shown) in reciprocating movement within the bore of the nozzle 28. The piston assembly and the foam dispensing apparatus 10 have been described generally since they are old and well known in the art. However, they are of the type generally disclosed in U.S. Pat. No. 4,708,292, issued Nov. 24, 1987, assigned to the assignee of the present invention and specifically incorporated by reference herein in pertinent part.

As seen in FIGS. 1 and 2 a high density cartridge heater 34 is inserted into a receptacle machined out in the body of the valve block 20. The electrical supply lines 35, appropriately insulated and shrink-wrapped, supply the current to heat the cartridge heater 34 which then, by conduction heating, heat the surrounding valve block 20 and the mixing chamber and isocyanate and polyol infeed ports (all not shown) contained therewithin. Cartridge heater 34 is easily accessible from the exterior of the valve block 20 of assembly 10 for removal or repair by removal of the cylinder 19.

The cartridge heaters 34, only one of which is shown in FIGS. 1 and 2, can be any suitable commercially available heater, such as that available from TEMCO Electric Heater Corporation, which are suitably sized to fit within the machined out receptacle in valve block 20. It is preferable to employ two high density cartridge heaters 34 on either side of the valve block 20, although it is conceivable that a single heater 34 could be used. The cartridge heaters 34 typically are approximately 80 watt, but could vary from about 55 to about 100 watt, and are supplied by a low voltage, 120 volt, power source, but are sufficient to elevate the valve block 20 temperature to a range of between about 100° to about 125° Fahrenheit. This generally corresponds with the temperature of the feed plural components into the valve block 20 since these components are fed in at a temperature generally exceeding 100° Fahrenheit. The matching of the temperature of the valve block 20 and the temperature of the feed components entering via isocyanate fluid hose 25 and polyol component fluid hose 22 ensures the complete reaction and thorough mixing of the components to form the high quality desired polyurethane foam product during the initial use of the foam dispensing apparatus after an extended period of nonuse.

Cartridge heater 34 can employ insulated flexible nickel lead wires in the ceramic end cap to prevent shorting of the nickel lead wires against the sheath of the cartridge. Resistance wire is contained within the cartridge sheath. A standard termination block (not shown), such as that available from Electrovert Incorporated, may be employed at the rear of the upper gun 16 to connect the flexible nickel lead wires of the cartridge heaters 34 with the electrical lines 35.

The dispensing supply assembly, indicated generally by the numeral 38, is shown in FIG. 3. This assembly includes a hose heater power supply control box, indicated generally by the numeral 39 and a power supply outlet 40. Power supply line 41 supplies electrical power to the hose heater power supply control box 39 and into the resistance coil heaters (not shown) within polyol and isocyanate fluid hoses 22 and 25, respectively, via power lines 54 and 55 and electrical connections 48 and 49, respectively. The heater transformer 36 receives power via power supply line 42 and feeds the cartridge heaters 34, (not shown) via electrical lines 35. Heater transformer 36 is a stepdown transformer that converts the 120 volt AC supply to a more desired lower voltage, such as 36 volts, for constant lower voltage supply to the cartridge heaters 34.

A polyol supply tank 45 and isocyanate supply tank 46 are connected via compressed gas supply lines 43 to compressed air supply tank 44. Appropriate regulator apparatus 47 on the compressed gas supply tank 44 controls the flow of compressed gas into the tanks 45 and 46 to permit the polyol and isocyanate components to be pumped through the fluid hoses 25 and 22, respectively, to the foam dispensing apparatus 10. Regulator apparatus 47 can be a stepdown dual regulator system to permit different or variable pressures to be maintained in tanks 45 and 46. The pressure heads within tanks 45 and 46 forces the polyol and isocyanate components upward through dip tubes (not shown) within the tanks 45 and 46 and into polyol hose 25 and isocyante hose 22, respectively. This pressure can be measured by appropriate pressure gauges on the compressed gas supply tank 41. The dispensing apparatus 10 can be retained in a holster adjacent a work area, as is diagramatically illustrated in FIG. 3.

The polyol fluid hose 22, the isocyanate fluid hose 25 and the electrical supply lines 35 for the cartridge heaters 34 can extend over a relatively long distance between the supply tanks 45 and 46 and the using location for the dispensing apparatus 11. Overhead support apparatus, indicated generally by the numeral 50 in FIG. 5, can be employed to control the hoses and supply lines and prevent tangling.

In operation, the dispensing apparatus 10 has its valve block 20 preheated prior to operation by the connection of the electrical cartridge heaters via power supply line 42 to power supply 40. After a suitable period of time, such as about 5 to 20 minutes, the valve block 20 is sufficiently heated to be within the range of the temperature of the isocyanate and polyol feed components that travel through polyol fluid feed hose 25 and the isocyanate fluid feed hose 22. The operator grasps the dispensing apparatus 10 by handle 11 and, after the suitable preheating time following the extended period of non-use, initiates the foaming of shots by depressing the trigger 12. The isocyanate and polyol components flow heated through their respective hoses into the valve block 20 that is now at approximately the same temperature as the isocyante and polyol components to permit uniform mixing and reaction of the components to occur within the mixing chamber in the dispensing assembly 10. The uniformly mixed and reacted isocyanate and polyol components are then dispensed to the packaging or other end use application through the nozzle 28.

While the preferred structure in which the principles of the present invention had been incorporated is shown and described above, it is to be understood that the invention is not to be limited to the particular details thus presented, but in fact, widely different means may be employed in the practice of the broader aspects of this invention. The scope of the appended claims is intended to encompass all obvious changes in the details, materials, arrangement of parts and method of operation which will occur to one of skill in the art upon a reading of the disclosure. For example, any appropriate pressurized gas may be employed in place of the compressed air to perform the same vital task during operation of the apparatus.

Having thus described the invention what is claimed is:

1. In a plural component dispensing apparatus for dispensing foam formed from the mixing of plural components supplied through flow channels in a valve block to a mixing chamber for impingement mixing therewithin, the improvement comprising:

heating means mounted in and easily removable from the valve block in the dispensing apparatus for heating the mixing chamber within the dispensing apparatus to a desired temperature prior to supplying thereto and the mixing and reaction therewithin of the plural components.

2. The apparatus according to claim 1 wherein the valve block further includes at least one recess to receive the heating means.

3. The apparatus according to claim 2 wherein the heating means further comprises at least one electrical resistance heater cartridge.

4. The apparatus according to claim 3 further comprising a resistance heater cartridge within the valve block adjacent each plural component flow channel, each flow channel being connected to an infeed supply line.

5. The apparatus according to claim 4 wherein the plural components further comprise a polyol component and an isocyanate component.

6. The apparatus according to claim 5 wherein the polyol component further is supplied from a polyol supply tank connected to the dispensing apparatus by a polyol supply line.

7. The apparatus according to claim 6 wherein the isocyanate component further is supplied from an isocyanate supply tank connected to the dispensing apparatus by an isocyanate supply line.

8. The apparatus according to claim 7 wherein the polyol supply line and the isocyanate supply line further are heated by heating means.

9. A method for heating a plural component foam dispensing apparatus to bring at least the mixing chamber in the dispensing apparatus to the temperature of the plural components that are mixed therewithin, comprising:

(a) placing heating means within the foam dispensing apparatus to heat the mixing chamber; and (b) activating the heating means to heat the mixing chamber in the foam dispensing apparatus to approximately match the temperature of the plural components prior to the dispensing of an initial shot of foam to achieve a complete reaction and thorough mixing of the plural components within the mixing chamber.

10. The method according to claim 9 further comprising using at least one electrical resistance heater cartridge in the foam dispensing apparatus.

11. The method according to claim 10 further comprising using an isocyanate component and a polyol component as the plural components and feeding the isocyanate component and the polyol component via supply lines to the foam dispensing apparatus.

12. The method according to claim 11 further comprising placing a heater cartridge adjacent each of the polyol component supply line and the isocyanate component supply line in the foam dispensing apparatus.

13. The method according to claim 12 further comprising the polyol component supply line and the isocyanate component supply line in the foam dispensing apparatus each having infeed ports which are heated to the temperature of the polyol and isocyanate components.

* * * * *